June 26, 1962 — N. J. BATES ET AL — 3,040,641
PHOTOGRAPHIC FLASH REGULATOR
Filed Sept. 9, 1957 — 2 Sheets-Sheet 1

INVENTORS
NORMA JEAN BATES
DONALD A. BATES
BY Eugene C. Knoblock
ATTORNEY

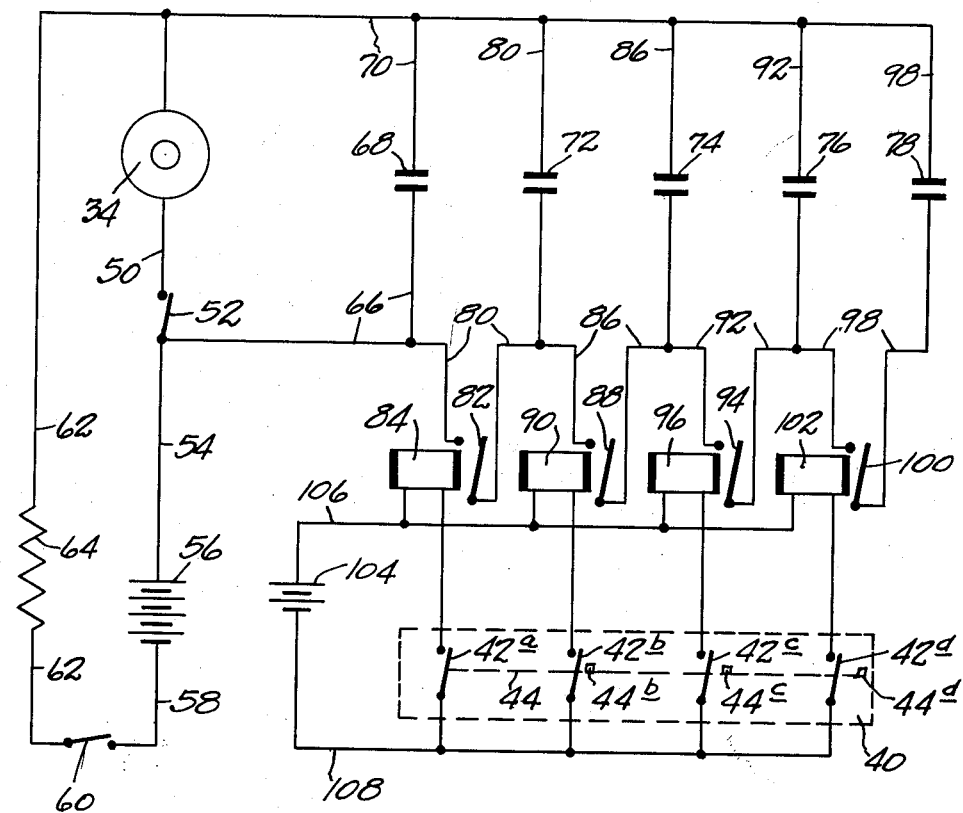

United States Patent Office 3,040,641
Patented June 26, 1962

3,040,641
PHOTOGRAPHIC FLASH REGULATOR
Norma Jean Bates and Donald A. Bates, both of 513 E. Irvington St., South Bend 14, Ind.
Filed Sept. 9, 1957, Ser. No. 682,976
3 Claims. (Cl. 95—11.5)

This invention relates to improvements in photographic flash regulators for use with photographic cameras having devices for controlling the light generated upon operation of the camera to expose a film.

The primary object of this invention is to provide a device of this character for controlling a lighting device associated with a camera simultaneously and automatically incident to manipulation of the lens setting means or range finder of the camera so as to regulate automatically the duration of light produced by the device coincident with the operation of the camera to expose a film and thereby avoid the necessity of adjusting a lighting device independently of the adjustment of the setting of the camera lens or range finder.

A further object is to provide a device of this character having a plurality of control elements of different electrical values and switch means for progressively and successively connecting said elements in a flash tube circuit, which means are correlated with the means for focusing the camera.

Other objects will be apparent from the following specification.

In the drawings:

FIG. 5 is a wiring diagram illustrating my invention.

Figure 1:
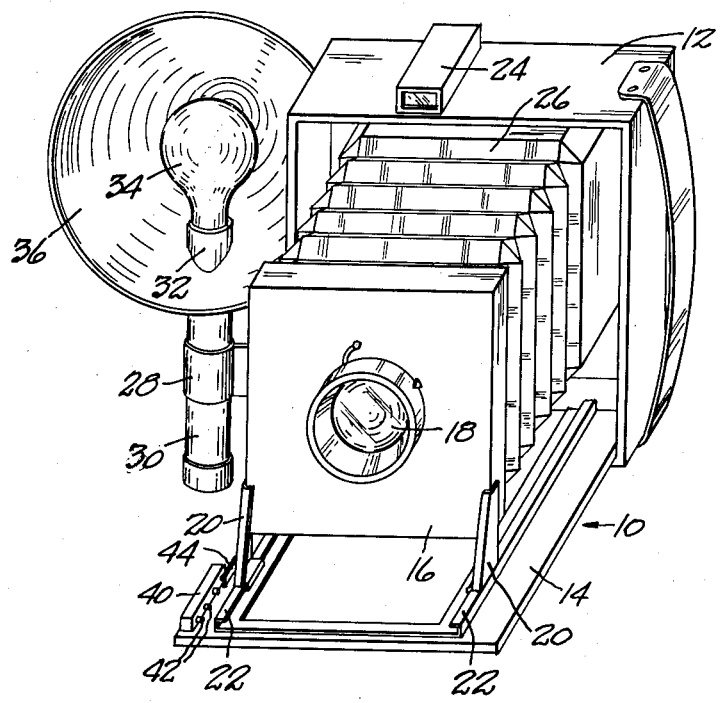
FIG. 1 is a perspective view illustrating one embodiment of my invention.
Figure 2:
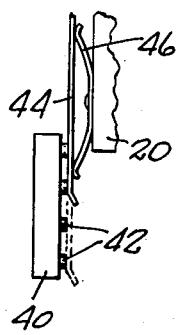
FIG. 2 is an enlarged detail plan view illustrating a control switch used in conjunction with my device.

Referring to the drawings and particularly to FIGS. 1 and 2 which illustrate one embodiment of the invention, the numeral 10 designates a camera of the so-called "Speed Graphic" or bellows type, having a casing or frame 12 with suitable film-reeling means (not shown) and having a pivoted side wall 14 adapted to be swung to an open position as shown. A lens mounting board 16 carrying a suitable lens 18 is provided with support members 20 which traverse slidably track members 22 carried by the casing part 14. The camera includes a conventional view finder 24 and a bellows 26 connected to the casing part 12 and the lens board 16 to protect film in the camera from access of light thereto by any means except through the lens. Cameras of this character are provided with simple means (not shown) for indicating lens setting for different conditions, and it will be understood that the lens board position relative to the track 22 is different for each focus of the lens.

An electronic photo flash device, sometimes called an electronic flash device and of the type produced by Graflex, Inc., of Rochester, New York, under the trademark "Stroboflash," and produced by the Heiland Division of Minneapolis-Honeywell Corporation under the trade-mark "Strobonar," is preferably carried by the casing 12 and, as illustrated, may be supported by a bracket 28 projecting laterally from the casing 10 and mounting a casing 30 carrying the electrical components of the unit and storage batteries, etc. The casing 30 includes a socket 32 for a light bulb 34. A light reflector 36 is also carried by the casing 30 and directs the light upon the subject.

An electric switch 40 is mounted upon the member 14 parallel to and alongside one of the tracks 22. The switch is of the multiple contact type and its contacts 42 are arranged in spaced relation in a line parallel to the adjacent track 22 and adapted to be engaged by an elongated actuator member 44 parallel to the track 22 and carried by a support for the lens board 16. If desired, the connection between the members 44 and 20 may be provided by a resilient part 46, as best seen in FIG. 2. The arrangement is such that the contacts 42 of the switch 40 are successively engaged upon movement of the lens board 16 in one direction, and are successively disengaged upon movement of the lens board in the opposite direction. Consequently, for each position of focus of the lens board, a selected number or group of the switch contactors 42 may be actuated.

The switch 40 is connected in a control circuit for the electronic photo flash device and the camera shutter (not shown) in an arrangement of the character illustrated in FIG. 5. The electronic flash tube 34 of the electronic photo flash device is connected by lead 50 with a synchronization switch 52. Lead 54 connects the switch 52 with a main power supply 56 of the high voltage type. Lead 58 extends from power supply 56 to control switch 60. Lead 62 extends from control switch 60 to the electronic flash tube 34 and preferably has a resistance 64 interposed therein.

The synchronization switch 52 is normally open and a lead 66 branches therefrom and extends to condenser 68. Lead 70 connects condenser 68 with lead 62.

A plurality of additional condensers, here shown as condensers 72, 74, 76 and 78, are connected in the circuit in parallel relation to condenser 68 and to each other. Lead 80 connects condenser 72 in parallel to condenser 68 and has a relay associated therewith consisting of a normally open switch 82 and an actuating solenoid 84. Lead 86 connects condenser 74 in parallel to condenser 72 and has a relay interposed therein consisting of the normally open switch 88 and switch actuating solenoid 90. Lead 92 connects condenser 76 in parallel to condenser 74 and has a relay therein consisting of normally open switch 94 and actuating solenoid 96. Lead 98 connects condenser 78 in parallel to condenser 76 and has a relay therein consisting of the normally open switch 100 and the actuating solenoid 102.

The switch 40 is located in a secondary circuit in which the relays 84, 90, 96 and 102 are connected in parallel. The secondary circuit is powered by a power supply member, such as a low voltage battery 104. The circuit has a lead 106 with parallel connections to each of the relays 84, 90, 96 and 102. A return lead 108 extends from the power supply 104 to various switch elements, such as switch members 42a, 42b, 42c and 42d, which are connected, respectively, to the relays 84, 90, 96 and 102. The switch actuator 44 is shown schematically in FIG. 5 and, as shown, has lost motion with the switch elements 42b, 42c and 42d as indicated schematically by the difference in the position of abutments 44b, 44c and 44d with respect to the associated switch elements 42b, 42c and 42d.

The number of condensers employed may vary according to the requirements of the electronic photo flash device. The condensers will have selected values and preferably the value of the condensers 68 and 72 will be substantially the same. The value of condenser 74 will preferably be substantially equal to the sum of the values of the condensers 68 and 72. The value of the condenser 76 will preferably be equal to the sum of the values of the condensers 68, 72 and 74, and the value of the condenser 78 will preferably be equal to the sum of the values of the condensers 68, 72, 74 and 76. By way of example, the two condensers 68 and 72 may be of the value of 25 mfd. Condenser 74 may be of the value of 50 mfd. Condenser 76 may be of the value of 100 mfd., and condenser 78 may be of the value of 200 mfd. It will be apparent that the condenser 68 is always in circuit with the flash tube 34 when the control switch 60 is closed, assuming, of course, the closing additionally of the synchronization switch 52.

The setting of the switch 40 determines whether or not any of the condensers 72, 74, 76 and 78 are connected in the operating circuit of the flash tube 34. Thus at a selected setting or adjustment of the lens board and a selected focus of the lens, the switch 42a is closed, thereby energizing the solenoid 84 to close the relay switch 82 and connect the condenser 72 in circuit with the flash tube 34 in addition to the condenser 68. A further adjustment movement of the switch 40 incident to focusing of the lens 18 by movement of the lens board 16 closes the switch 42b while the switch 42a remains closed. The closing of the switch 42b actuates the solenoid 90 of the relay switch 88 and connects condenser 74 in circuit with flash tube 34 in addition to the condensers 68 and 72. Similarly, additional or progressive movement of the switch actuator 44 will close the circuits of the other switch elements of the switch at different predetermined settings or lens adjustments until at some selected point each of the switches 42 will be closed, and all of the condensers 68, 72, 74, 76 and 78 will be connected in circuit with the flash tube. It will be understood that the flash duration of the flash tube is a function of the capacitance in the operating circuit of the electronic photo flash device and, consequently, the switch 40 constitutes a selector or adjustment means controlling the flash duration which is preset incident to and simultaneously with the focusing of the camera by its lens focus means or range finder or any other device used to focus the camera. Therefore, the user is assured that the light required for the lens setting of the camera and the distance between the camera and the object to be photographed will be assuredly and automatically produced by the electronic photo flash tube 34 when the electronic photo flash device is actuated coincident with the actuation of the camera shutter. It will be understood, of course, that the opening of the shutter of the camera must be precisely synchronized with respect to the actuation of the electronic photo flash device as is well understood in the art, and achieved by the arrangement of synchronism switch 52 in the circuit.

While the use of a secondary circuit to control the switches which determine the number of condensers connected in circuit with the flash tube 34 is preferred in most instances in order to provide adequate current-carrying capacity at the control switches, it is not necessary that relays be employed and, instead thereof, the progressive switch 40 may be connected directly in the main circuit, as by connecting switch element 42a in lead 80 in place of relay switch 82, by connecting switch 42b in lead 86 in place of relay switch 88, by connecting switch 42c in lead 92 in place of relay switch 94, and by connecting switch 42d in lead 98 in place of relay switch 100. In such an alternate construction, the switch elements 42a, 42b, 42c and 42d will preferably constitute parts arranged for sequential or progressive or successive operation by a switch actuator 44.

Figure 3:
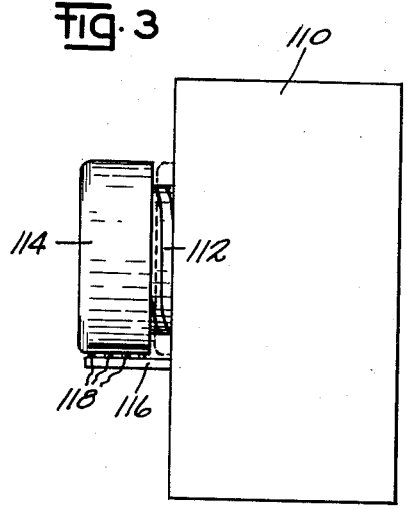
FIG. 3 is a side view of a camera having a different type of lens-adjusting means and provided with a switch for use with my invention.

The application of the invention to a camera of the helical focusing type is illustrated in FIG. 3. In this construction the camera case 110 has a helical adjusting member 112 for shifting lens holder 114. The focusing of the camera varies the spacing of the lens holder from the camera housing 110 and shifts the lens holder relative to a multiple or pregressive switch 116 having a plurality of switch contact elements 118 successively engageable by the lens holder 114 or a switch contactor carried thereby. The switch 116 will control an electronic photo flash device in the same manner described above, it being understood that the lens holder will have one retracted adjustment in which none of the elements of the switch 116 are actuated, and an opposite extreme position in which all of the switch contact parts 118 will be simultaneously actuated.

Figure 4:
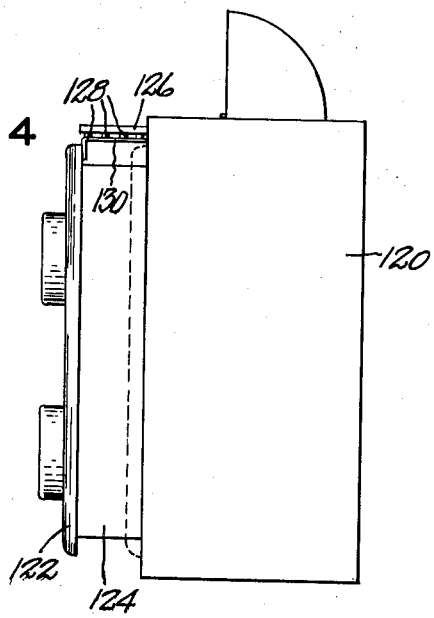
FIG. 4 is a side view of another type of camera illustrating the application of a control switch to the lens-adjusting means thereof for use in conjunction with my invention.

FIG. 4 illustrates the application of the invention to a camera of the twin lens reflex type, having a housing 120 and a lens-mounting plate 122 mounted on a telescoping structure 124 slidable into and out of the camera casing 120. A switch 126 is carried by the casing 120 and has a plurality of spaced contacts 128 successively engageable and actuated by a switch contactor 130 carried by the lens plate 122. The switch 126 will be so constructed and its contacts 128 will be so spaced and positioned that movement of the lens plate 122 through its full path of movement will result in selective operation of the switch as between a condition in which none of its contacts 128 are actuated and a condition in which all of its contacts 128 are actuated. The switch 126 will be connected in a circuit similar to that shown in FIG. 5 in the same manner as switch 40 is connected in FIG. 5.

While the preferred embodiment of the invention has been illustrated and described herein, it will be understood that changes in construction may be made within the scope of the appended claims without departing from the spirit of the invention.

We claim:

1. In combination, a camera having a casing and an adjustable lens focusing means, an electronic photoflash device carried by the casing and having an electronic flash tube fixedly positioned on said casing and a control circuit, a plurality of condensers, means associated with each condenser for successively and additively connecting said condensers in said circuit, and a selector switch for actuating said last named means, said selector switch including a contactor carried by said camera casing and a contactor carried by said lens focusing means, one of said contactors constituting a plurality of spaced contact elements successively engaged by the other contactor.

2. In combination, a camera, shiftable means for focusing said camera, an electronic photoflash device for energizing a flash tube fixedly mounted on said camera in proper timed relation to actuation of said camera and including an electrical circuit and a plurality of flash tube regulating condensers connected in parallel, and switch means controlled by the actuation of said focusing means for successively connecting said condensers in said circuit and disconnecting said condensers from said circuit in predetermined relation to adjustment of said focusing means.

3. In combination, a camera, shiftable means for focusing said camera, an electronic photoflash device for energizing a flash tube fixedly carried by said camera in proper timed relation to actuation of said camera and including an electrical circuit and a plurality of flash tube regulating condensers connected in parallel in said circuit, and a plurality of switches each controlling a regulating condenser, and switch actuating means having co-operating parts carried respecctively by said camera and said shiftable focusing means for successively and accumulatively actuating said switches as said focusing means is shifted progressively through the full range of adjustment.

References Cited in the file of this patent

UNITED STATES PATENTS

| | | |
|---|---|---|
| 2,480,122 | Daniels | Aug. 30, 1949 |
| 2,596,376 | De Goeij | May 13, 1952 |
| 2,676,243 | Mayers | Apr. 20, 1954 |

FOREIGN PATENTS

| | | |
|---|---|---|
| 610,146 | Germany | Mar. 4, 1935 |